United States Patent
Haavaldsen et al.

(10) Patent No.: US 11,345,830 B2
(45) Date of Patent: May 31, 2022

(54) LINER REINFORCED BY NON-WOVEN FIBRES FOR IMPACT RESISTANT GRP PIPES

(71) Applicant: Amiblu Technology AS, Sandefjord (NO)

(72) Inventors: Jane Hilary Thatcher Haavaldsen, Sandefjord (NO); Kjell Tony Syversen, Larvik (NO)

(73) Assignee: AMIBLU TECHNOLOGY AS, Sandefjord (NO)

( * ) Notice: Subject to any disclaimer, the term of this patent is extended or adjusted under 35 U.S.C. 154(b) by 199 days.

(21) Appl. No.: 16/491,706

(22) PCT Filed: Mar. 9, 2018

(86) PCT No.: PCT/EP2018/055922
§ 371 (c)(1),
(2) Date: Sep. 6, 2019

(87) PCT Pub. No.: WO2018/162718
PCT Pub. Date: Sep. 13, 2018

(65) Prior Publication Data
US 2021/0130646 A1    May 6, 2021

(30) Foreign Application Priority Data

Mar. 9, 2017  (EP) .................................... 17000381
Apr. 20, 2017  (EP) .................................... 17167302

(51) Int. Cl.
| | | |
|---|---|---|
| *C09D 167/06* | (2006.01) | |
| *B32B 5/26* | (2006.01) | |
| *B29D 23/00* | (2006.01) | |
| *B32B 5/02* | (2006.01) | |

(52) U.S. Cl.
CPC ............. *C09D 167/06* (2013.01); *B32B 5/26* (2013.01); *B29D 23/001* (2013.01); *B32B 5/022* (2013.01); *B32B 2250/20* (2013.01); *B32B 2260/021* (2013.01); *B32B 2260/046* (2013.01); *B32B 2262/0261* (2013.01); *B32B 2262/0276* (2013.01); *B32B 2262/101* (2013.01); *B32B 2262/14* (2013.01); *B32B 2307/54* (2013.01); *B32B 2307/718* (2013.01)

(58) Field of Classification Search
CPC ........ B32B 2262/101; B32B 2307/732; B32B 2250/20; B32B 5/02; B32B 2597/00; B32B 5/26; B32B 2260/021; B32B 2307/558; B32B 2307/734; B32B 2262/14; B32B 2307/4026; B32B 2307/718; B32B 2307/54; B32B 5/022; B32B 2250/02; B32B 2260/046; B32B 2262/0276; B32B 5/08; F16L 58/1009; B29C 53/60; C09D 167/06; B29D 23/001; C08K 3/013

See application file for complete search history.

(56) References Cited

U.S. PATENT DOCUMENTS

| | | | | |
|---|---|---|---|---|
| 2003/0234056 | A1* | 12/2003 | Woolstencroft | ........ B32B 27/02 138/98 |
| 2016/0159986 | A1* | 6/2016 | Thomas | ................. C08G 75/23 175/57 |

FOREIGN PATENT DOCUMENTS

| | | |
|---|---|---|
| EP | 3216593 A1 | 9/2017 |
| JP | 2001179831 A | 7/2001 |
| JP | 2001315205 A | 11/2001 |
| KR | 101621355 B1 | 5/2016 |
| WO | 2017153530 A1 | 9/2017 |

OTHER PUBLICATIONS

Machine translation of KR 101 621 355 B1; Publication date: May 10, 2016.*
"International Search Report and Written Opinion for PCT Patent Application No. PCT/EP2018/055922", dated Jun. 20, 2018, 8 pages.
"Communication pursuant to Article 94(3) EPC for European Patent Application No. 18709597.2", dated Jul. 27, 2020, 3 Pages.
"Office Action for Columbian Patent Application No. 2019/0009626", dated May 13, 2021, 6 Pages.

* cited by examiner

*Primary Examiner* — Vishal I Patel
(74) *Attorney, Agent, or Firm* — Calfee, Halter & Griswold LLP

(57) ABSTRACT

The invention relates to a glass-reinforced plastic pipe liner of improved impact performance comprising layer B) from unsaturated polyester resin, optionally mixed with vinyl ester resin reinforced by non-woven fibres. Layer B) comprises colour pigments at 0.2-5.0 wt %. The invention provides flexible liners for pressure and non-pressure GRP pipes. It improves impact performance of the pipe liner whilst offering also improvements in abrasion resistance, water-jet resistance for high pressure cleaning without liner damage, increased expected lifetime by improved resistance to internal pressure and permits pigmentation of the liner. The invention also encloses a process for producing the glass-reinforced plastic pipe liner.

15 Claims, No Drawings

LINER REINFORCED BY NON-WOVEN FIBRES FOR IMPACT RESISTANT GRP PIPES

TECHNICAL FIELD AND INDUSTRIAL APPLICABILITY OF THE INVENTION

The invention relates to a glass-reinforced plastic pipe liner of improved impact performance comprising layer B) from unsaturated polyester resin, optionally mixed with vinyl ester resin reinforced by non-woven fibres. This layer B) comprises colour pigments at 0.2-5.0 wt %. The invention provides flexible liners for pressure and non-pressure GRP pipes. It improves impact performance of the pipe liner whilst offering also improvements in abrasion resistance, water-jet resistance for high pressure cleaning without liner damage, increased expected lifetime by improved resistance to internal pressure and permits pigmentation of the liner. The invention also encloses a process for producing the glass-reinforced plastic pipe liner.

BACKGROUND OF THE INVENTION

Glass fibre reinforced pipes (hereinafter GRP pipes) are somewhat sensitive to impact damage compared to thermoplastic pipes. The ability for GRP pipes to offer improved impact resistance but also maintaining inherent benefits offered by glass reinforced plastic piping with excellent lifetime, long term stiffness and low creep properties, is therefore of interest.

It is known that the introduction of flexible inner pipe-bore (or liner) materials can improve resistance to cracking on external impact and reduce the subsequent risk of passage of water through the pipe wall. However, flexible liners based on unsaturated polyester resins with no-glass reinforcement may also have limited resistance to impact in cold weather. Also, cracking due to difference in thermal affects between reinforced and non-reinforced layers in the pipe may result even in the absence of additional impact events. It should be noted that hereinafter all use of the expression "pipe" has to be taken as being identical and synonymous to the use of the expression "tube".

Pigmentation of the liner is sometimes required by the pipe user to clearly distinguish different types of pipe in an installation but must be of a lighter colour to permit visual inspection of the liner in service and not hide damage and deficiencies. Still, addition of pigments to liners of unsaturated polyester resins for pipes, when manufactured by filament winding, particularly but not limited to continuous filament winding processes with high production efficiency, will result in reduced pipe performance as the pigments affect mechanical performance and interfere with the reinforcing glass fibres resulting in reduced pipe performance. This pipe performance reduction is most notable when testing pipes for resistance to internal pressure, or hydrostatic design basis testing. All pigment inclusion in unsaturated polyester resins will affect the mechanical performance of the resin.

This known disadvantage is overcome by the careful selection of liner construction, unsaturated polyester, nature of reinforcement, construction of layers and pigmentation of the invention presented herewith.

SUMMARY OF THE INVENTION

The invention is a combination of novel liner constructions which identify flexible liners for pressure and non-pressure GRP pipes improving impact performance of the pipe liner whilst offering also improvements in abrasion resistance, water-jet resistance for high pressure cleaning without liner damage, increased expected lifetime by improved resistance to internal pressure and—optionally—permits pigmentation of the liner. Choice of the liner construction, unsaturated polyester, nature of reinforcement, construction of layers and also pigmentation has surprisingly permitted all of the above pipe properties to be achieved. The expression "tube" can be used in a synonymous way to the use of "pipe" hereinafter.

It is thus a primary object of the invention to provide a flexible liner for improving impact performance for pressure and non-pressure GRP pipes.

It is a very desirable further object of the invention to provide a flexible liner for pressure and non-pressure GRP pipes which combines this improved impact performance while allowing proper pigmentation of the liner.

It is a further desirable follow-object of the invention to provide a flexible liner for pressure and non-pressure GRP pipes which combines this improved impact performance while also offering improvements in abrasion resistance, and/or water-jet resistance for high pressure cleaning without liner damage, and/or increased expected lifetime by improved resistance to internal pressure, while preferably also allowing pigmentation of the liner.

One embodiment of the invention is a glass-reinforced plastic pipe liner of improved impact performance comprising:
  a layer B) consisting of a coat being reinforced by non-woven fibres, the coat being formed from at least one unsaturated polyester resin, optionally mixed with at least one vinyl ester resin;
  wherein the layer B) comprises colour pigments present at 0.2-5.0 wt % per weight of the unsaturated polyester resin.

This embodiment of the invention is also a glass-reinforced plastic pipe liner comprising:
  a layer B) consisting of a coat being reinforced by non-woven fibres, the coat being formed from at least one unsaturated polyester resin, optionally mixed with at least one vinyl ester resin;
  wherein the layer B) comprises colour pigments present at 0.2-5.0 wt % per weight of the unsaturated polyester resin.

In a preferred embodiment the following condition applies:
  wherein the glass-reinforced plastic pipe liner of improved impact performance does not comprise a layer consisting of a coat being reinforced by chopped fibre strands.

In another preferred embodiment the following condition applies:
  wherein the glass-reinforced plastic pipe liner of improved impact performance does not comprise a layer consisting of a coat being formed from at least one unsaturated polyester resin being further reinforced by chopped fibre strands.

Preferably, and in line with the definition of "liner" below, the "glass-reinforced plastic pipe liner of improved impact performance" mentioned above is a "glass-reinforced plastic pipe liner of improved impact performance applied to the interior of a pipe".

One further embodiment of the invention (called hereinafter "EMBODIMENT Z") is a glass-reinforced plastic pipe liner of improved impact performance comprising:

a layer B) consisting of a coat being reinforced by non-woven fibres, the coat being formed from at least one unsaturated polyester resin, optionally mixed with at least one vinyl ester resin.

In an optional further embodiment of the glass-reinforced plastic pipe liner according to the invention it comprises in addition a layer A) consisting of a coat being reinforced by a synthetic veil formed from spun-bond or thermally bonded fibres of polyester, polyamide or mixtures thereof, the coat being formed from at least one unsaturated polyester resin, optionally mixed with at least one vinyl ester resin, optionally comprising colour pigments present at 0.2-5.0 wt % per weight of the unsaturated polyester resin.

This embodiment might also be an embodiment of "EMBODIMENT Z".

In a preferred embodiment of the glass-reinforced plastic pipe liner according to the invention, the mechanical properties of the resin in layer B and/or in the optional layer A) are >5 MPa tensile strength and >30% tensile elongation to break in a non-reinforced, non-pigmented, cured state.

This embodiment might also be an embodiment of "EMBODIMENT Z".

In a further preferred embodiment of the glass-reinforced plastic pipe liner according to the invention, the pigments in layer B) and in optional layer A) are zinc sulphide pigments wherein the zinc sulphide pigments are present at 0.5-4.5 wt % per weight of the unsaturated polyester preferably at 1.0-4.0 wt % per weight of the unsaturated polyester.

Another aspect the invention relates to a process for the production of the glass-reinforced plastic pipe liner according to the invention, wherein the process is a continuous filament winding process or a discontinuous filament winding process.

These and other objects of the present invention will become apparent from the following general and detailed description of the invention.

DETAILED DESCRIPTION AND PREFERRED EMBODIMENTS OF THE INVENTION

The current invention presents a novel combination of liner constructions, use of unsaturated polyester, nature of reinforcement and construction of layers as well as pigmentation.

The liner construction employs unsaturated polyester resin(s), with or without additional toughening by vinyl ester resin(s). Mechanical properties of the resin are preferentially >5 MPa tensile strength and >30% tensile elongation to break in a non-reinforced, non-pigmented, cured state, i.e. highly flexible. The highly flexible unsaturated polyester resin performance parameters with low strength do not seem at first glance appropriate for GRP piping but careful choice of liner construction and reinforcement do result in excellent pipe properties.

Thus, in the main embodiment the invention rests in a glass-reinforced plastic pipe liner of improved impact performance comprising:
a layer B) consisting of a coat being reinforced by non-woven fibres, the coat being formed from at least one unsaturated polyester resin;
wherein the layer B) comprises colour pigments present at 0.2-5.0 wt % per weight of the unsaturated polyester resin.

Very preferably, the at least one unsaturated polyester resin of Layer B) is optionally mixed with at least one vinyl ester resin.

This embodiment is hereinafter referred to, if reference is made to "the glass-reinforced plastic pipe liner according to the invention". In all other references to "the invention" this includes both this embodiment and EMBODIMENT Z (see below) as well as EMBODIMENTS X and Y (see also below).

Thus, in another separate main embodiment (called "EMBODIMENT Z") the invention rests in a glass-reinforced plastic pipe liner of improved impact performance comprising:
a layer B) consisting of a coat being reinforced by non-woven fibres, the coat being formed from at least one unsaturated polyester resin, optionally mixed with at least one vinyl ester resin.

In a preferred embodiment of the glass-reinforced plastic pipe liner according to the invention (as well EMBODIMENT Z) the following condition (proviso) applies:
wherein the glass-reinforced plastic pipe liner of improved impact performance does not comprise a layer consisting of a coat being reinforced by chopped fibre strands.

In another preferred embodiment of the glass-reinforced plastic pipe liner according to the invention (as well EMBODIMENT Z) the following condition (proviso) applies:
wherein the glass-reinforced plastic pipe liner of improved impact performance does not comprise a layer consisting of a coat being formed from at least one unsaturated polyester resin being further reinforced by chopped fibre strands.

Preferably, and in line with the definition of "liner" below, the "glass-reinforced plastic pipe liner" mentioned above in the "the glass-reinforced plastic pipe liner according to the invention" as well in EMBODIMENT Z is a "glass-reinforced plastic pipe liner applied to the interior of a pipe".

A further preferred embodiment of the glass-reinforced plastic pipe liner according to the invention is a glass-reinforced plastic pipe liner of improved impact performance applied to the interior of a pipe comprising a layer B) consisting of a coat being reinforced by non-woven fibres, the coat being formed from at least one unsaturated polyester resin, optionally mixed with at least one vinyl ester resin;
wherein the layer B) comprises colour pigments present at 0.2-5.0 wt % per weight of the unsaturated polyester resin and
wherein the glass-reinforced plastic pipe liner of improved impact performance does not comprise a layer consisting of a coat being formed from at least one unsaturated polyester resin being further reinforced by chopped fibre strands.

A further preferred embodiment of the glass-reinforced plastic pipe liner according to the invention is a glass-reinforced plastic pipe liner of improved impact performance applied to the interior of a pipe comprising a layer B) consisting of a coat being reinforced by non-woven fibres, the coat being formed from at least one unsaturated polyester resin, optionally mixed with at least one vinyl ester resin;
wherein the layer B) comprises colour pigments present at 0.2-5.0 wt % per weight of the unsaturated polyester resin and
wherein the glass-reinforced plastic pipe liner of improved impact performance does not comprise a layer consisting of a coat being reinforced by chopped fibre strands.

In any of the conditions (provisos) or embodiments including such a condition (proviso) above, wherein a layer consisting of a coat being formed from at least one unsaturated polyester resin is mentioned, this includes also a layer consisting of a coat being formed from at least one unsaturated polyester resin, being optionally mixed with at least one vinyl ester resin.

In any of the conditions (provisos) or embodiments including such a condition (proviso) above, wherein a layer consisting of a coat being reinforced by chopped fibre strands is mentioned, this includes also a layer consisting of a coat being reinforced by chopped fibre strands with the fibres being glass fibres or being a glass fibre layer of chopped strands.

A further preferred embodiment of the glass-reinforced plastic pipe liner according to the invention is a glass-reinforced plastic pipe liner of improved impact performance applied to the interior of a pipe consisting of a layer B) consisting of a coat being reinforced by non-woven fibres, the coat being formed from at least one unsaturated polyester resin, optionally mixed with at least one vinyl ester resin, wherein the layer B) comprises colour pigments present at 0.2-5.0 wt % per weight of the unsaturated polyester resin.

In one further embodiment of the glass-reinforced plastic pipe liner according to the invention comprises in addition:
- a layer A) consisting of a coat being reinforced by a synthetic veil formed from spun-bond or thermally bonded fibres of polyester, polyamide or mixtures thereof, the coat being formed from at least one unsaturated polyester resin, optionally mixed with at least one vinyl ester resin, optionally comprising colour pigments present at 0.2-5.0 wt % per weight of the unsaturated polyester resin.

A further preferred embodiment of the glass-reinforced plastic pipe liner according to the invention is a glass-reinforced plastic pipe liner of improved impact performance applied to the interior of a pipe consisting of
- a layer B) consisting of a coat being reinforced by non-woven fibres, the coat being formed from at least one unsaturated polyester resin, optionally mixed with at least one vinyl ester resin, wherein the layer B) comprises colour pigments present at 0.2-5.0 wt % per weight of the unsaturated polyester resin and
- a layer A) consisting of a coat being reinforced by a synthetic veil formed from spun-bond or thermally bonded fibres of polyester, polyamide or mixtures thereof, the coat being formed from at least one unsaturated polyester resin, optionally mixed with at least one vinyl ester resin, layer A) optionally comprising colour pigments present at 0.2-5.0 wt % per weight of the unsaturated polyester resin.

In one further embodiment of the glass-reinforced plastic pipe liner of EMBODIMENT Z it comprises in addition:
- a layer A) consisting of a coat being reinforced by a synthetic veil formed from spun-bond or thermally bonded fibres of polyester, polyamide or mixtures thereof, the coat being formed from at least one unsaturated polyester resin, optionally mixed with at least one vinyl ester resin.

It should be stressed that the presented invention is aimed at a liner construction, thus a construction on the inside of a GRP pipe. In principle the GRP pipe is either of pressure or of non-pressure type. Thus, the layer B) as well as the optional layer A) are to be found—and mostly also formed—on the inside of a—and any standard—GRP pipe (pressure and non-pressure). So, these liners are the coats of the pipe that come into contact with the medium/material that is passing through the pipe. If the layer A) is not present and there are no additional layers other than layer B), it is the layer B) that is in contact with the medium/material passing through the pipe and is also connected to the further layers/coats of the GRP pipe extending to the outside. If the layer A) is present and there are no additional layers other than layers A) and B), it is the layer A) that is in contact with the medium/material passing through the pipe while layer B) is connected to the further layers/coats of the GRP pipe extending to the outside.

In one preferred embodiment of the liner according to the invention layer A) is not present and there are no additional layers other than layer B). Thus, the glass-reinforced plastic pipe liner of improved impact performance of the invention would be consisting of the layer B).

This embodiment might also be an embodiment of "EMBODIMENT Z" (and also EMBODIMENTS X and Y; see below).

In one other preferred embodiment of the liner according to the invention layer A) is present and there are no additional layers other than layers A) and B). Thus, the glass-reinforced plastic pipe liner of improved impact performance of the invention would be consisting of the layers A) and B).

This embodiment might also be an embodiment of "EMBODIMENT Z" (and also EMBODIMENTS X and Y; see below).

The GRP pipe to which the liner of the invention can be applied is any standard GRP pipe, in principle being of pressure and non-pressure type. Examples of such pipes are Flowtite® pipes. Fitting pipes are manufactured by processes similar to those described in U.S. Pat. No. 3,979,250. These pipes are by definition pressure and non-pressure GRP pipes. Pressure and non-pressure GRP pipes can be identified by nominal diameter (DN), pressure rating (PN), and stiffness class (SN). Diameters: The pipe dimensions are diameter controlled, with thickness varying according to pressure and stiffness. Standard GRP pipes can be supplied in nominal diameters from 100 mm up to 4000 mm. The most common diameters are in the range 300-3000 mm. Pressure: Pressure classes of GRP pipes range from PN1 to PN32 (1 to 32 bar). Pipes are pressure rated at full operating pressure even when buried to the maximum depth recommended. Due to the exceptionally high short-term strength, occasional surge pressure allowance is 40% above the pressure class. Stiffness Classes: When tested in ring bending standard stiffness classes for GRP pipes are SN2500, SN5000, and SN10000, with the numerical expressed in N/m2.

"Chopped fibre strands" is understood in the context of this invention as being fibres of a—sometimes random, sometimes aimed for achieving a homogeneous even layer—arrangement and flattened into a sheet wherein the fibres are chopped to the form of the sheet. The fibres are thus mostly arranged in 2 dimensions and are added on top of each other. In most preferred examples the copped fibres reach a layer of required thickness. Potential masses are between 100 and 1000 g/m². One example of this arrangement are chopped fibres (like e.g. glass fibres) that are chopped/cut to a length of 3 to 7, 4 to 6 or around 5 cm and added/"rained-on" the resin in a regular fashion, until a certain layer thickness of resin plus chopped fibre strands is reached (e.g. of 0.05-4.0 mm, of 0.1-2.0 mm, or of 0.1-1.0 mm). One other preferred example are "glass fibre layer of chopped strands" or chopped strands of fibre glass.

"Coat" is understood in the context of this invention as being a layer in a liner construct according to the invention for a GRP pipe (pressure and non-pressure) formed of a distinctive material (or mixture of materials) preferably applied in one distinctive production step.

"Colour Pigment" is understood in the context of this invention as pigments of any colour that may be added to the resin. Preferably these pigments are $TiO_2$ or ZnS (zinc sulphide) pigments. These pigments provide white colour but also coverage/opacity. Optionally, other colours are added as mixing colour adding a different colour—in very small amounts—to the base mix of e.g. $TiO_2$ or ZnS colour paste. These colour pigments are usually used in the form of a paste, which is preferably added to the resin in form of a paste.

"Glass-fibre" is understood in the context of this invention as being as any kind of material consisting of numerous extremely fine fibers of glass. This material may be continuous, cut or chopped.

"Glass-reinforced plastic pipe" or GRP pipe is any pipe of plastic material that has in any of its coats or layers reinforcement by glass-fibre material. One preferred example GRP pipes are "Flowtite® Pipes" as described above.

"Liner" is understood in the context of this invention as being one or more coats applied to the interior of a pipe.

"Non-woven fibres" is understood in the context of this invention as being fibres that are arranged in a fashion without being woven. The non-woven veil (formed by this non-woven fibres) is a three dimensional tissue manufactured from bound glass fibres which may be cut or near continuous melted fibres, bound often with a polymeric binder to maintain dimensional stability. In most preferred examples, the non-woven fibers reach a specific weight of 10-100 $g/m^2$, preferably 10-75 $g/m^2$ and most preferably 15-50 $g/m^2$. One preferred example is a "glass fibre non-woven veil".

"Spun-bond fibres" is understood in the context of this invention as being synthetic fibres arranged in a fashion to form a tissue without being woven.

"Synthetic veil" is understood in the context of this invention as being an arrangement of fibres of synthetic origin that are arranged in a non-woven way in a veil. In most preferred examples the fibres arranged into this "synthetic veil" provide a specific weight the "synthetic veil" of 10-100 $g/m^2$, preferably 10-75 $g/m^2$ and most preferably 15-50 $g/m^2$. One example of a non-woven veil with polyester fibres is Lantor Finishmat 6691.

"Thermally bonded fibres" is understood in the context of this invention as being fibres that are bonded to each other by the use of raised temperature.

"Unsaturated polyester resin" is understood in the context of this invention as being a thermosetting resin formed from any unsaturated polyester. Usually it is formed by the reaction of formed by the reaction of dibasic organic acids and polyhydric alcohols. Preferred examples of the basic components are maleic anhydride, isophthalic acid or orthophthalic anhydride.

"Vinyl ester resin" is understood in the context of this invention as being a resin based on a vinyl ester. A preferred example are vinyl ester (meth)acrylates especially Ashland Derakane 8084.

In one further embodiment of the glass-reinforced plastic pipe liner of the invention the liner comprises in the layer B) and in the optional layer A) colour pigments present at 0.2-5.0 wt % per weight of the unsaturated polyester resin; preferably comprising in the layer B) and the optional layer A) colour pigments present at 0.2-5.0 wt % per weight of the unsaturated polyester resin.

In one further embodiment of the glass-reinforced plastic pipe liner of the invention
the optional layer A) has—thermally bonded—a thickness of 0.05-2.0 mm, preferably a thickness of 0.1-1.0 mm, more preferably a thickness of 0.15-0.35 mm; and/or
the layer B) has a thickness of 0.1-4.0 mm, preferably a thickness of 0.2-2.0 mm, more preferably a thickness of 0.2-0.8 mm.

This embodiment might also be an embodiment of "EMBODIMENT Z".

In one further embodiment of the glass-reinforced plastic pipe liner of the invention
the layer B) is reinforced by a glass fibre non-woven veil.

This embodiment might also be an embodiment of "EMBODIMENT Z".

In another separate embodiment (called "EMBODIMENT X") the invention rests in a glass-reinforced plastic pipe liner of improved impact performance comprising in a glass-reinforced plastic pipe liner of improved impact performance produceable by a process comprising the steps of:
b) conveying, in a non-solid form at least one unsaturated polyester resin, optionally mixed with at least one vinyl ester resin to form a layer B) consisting of a coat formed from the at least one unsaturated polyester resin, optionally mixed with at least one vinyl ester resin, directly onto a mandrel or on top of an—optionally advancing—layer already on the mandrel circumferentially and axially to the mandrel by $2^{nd}$ application means, followed by applying as reinforcement non-woven fibres to the at least one unsaturated polyester resin, to form layer B);
wherein the unsaturated polyester resin, optionally mixed with at least one vinyl ester resin forming the layer B) comprises colour pigments present at 0.2-5.0 wt % per weight of the unsaturated polyester resin.

In one further embodiment of the glass-reinforced plastic pipe liner of this EMBODIMENT X it comprises in addition a step:
a) conveying, in a non-solid form at least one unsaturated polyester resin, optionally mixed with at least one vinyl ester resin to form a layer A) consisting of a coat formed from the at least one unsaturated polyester resin, optionally mixed with at least one vinyl ester resin directly onto a mandrel circumferentially and axially to the mandrel by $1^{st}$ application means, followed by applying as reinforcement a synthetic veil formed from spun-bond or thermally bonded fibres of polyester, polyamide or mixtures thereof to the at least one unsaturated polyester resin, to form layer A);
wherein the unsaturated polyester resin, optionally mixed with at least one vinyl ester resin forming the layer A) optionally comprises colour pigments present at 0.2-5.0 wt % per weight of the unsaturated polyester resin.

In another separate embodiment (called "EMBODIMENT Y") the invention rests in a glass-reinforced plastic pipe liner of improved impact performance comprising in a glass-reinforced plastic pipe liner of improved impact performance produceable by a process comprising the steps of:
b) conveying, in a non-solid form at least one unsaturated polyester resin, optionally mixed with at least one vinyl ester resin to form a layer B) consisting of a coat formed from the at least one unsaturated polyester resin, optionally mixed with at least one vinyl ester resin, directly onto a mandrel or on top of an— optionally advancing—layer already on the mandrel circumferentially and axially to the mandrel by $2^{nd}$ application means, followed by applying as reinforcement non-woven fibres to the at least one unsaturated polyester resin, to form layer B).

In one further embodiment of the glass-reinforced plastic pipe liner of this EMBODIMENT Y it comprises in addition a step:

a) conveying, in a non-solid form at least one unsaturated polyester resin, optionally mixed with at least one vinyl ester resin to form a layer A) consisting of a coat formed from the at least one unsaturated polyester resin, optionally mixed with at least one vinyl ester resin directly onto a mandrel circumferentially and axially to the mandrel by $1^{st}$ application means, followed by applying as reinforcement a synthetic veil formed from spun-bond or thermally bonded fibres of polyester, polyamide or mixtures thereof to the at least one unsaturated polyester resin, to form layer A).

In one further embodiment of the glass-reinforced plastic pipe liner of the invention the unsaturated polyester resin, optionally mixed with vinyl ester resin, in layer B) and/or optional layer A) includes pigments selected from $TiO_2$ and zinc sulphide, preferably from zinc sulphide;

and/or wherein the pigments are present at 0.5-4.5 wt % per weight of the unsaturated polyester preferably at 1.0-4.0 wt % per weight of the unsaturated polyester.

This embodiment might also be an embodiment of "EMBODIMENT X".

The $TiO_2$ and also the zinc sulphide is usually added to the resin in form of a paste. These pigments provide white colour but also coverage/opacity. Optionally, other colours are added as mixing colour adding a different colour—in very small amounts—to the base mix of e.g. $TiO_2$ or ZnS colour paste.

As said above, addition of pigments to liners of unsaturated polyester resins for pipes, when manufactured by filament winding, particularly but not limited to continuous filament winding processes with high production efficiency, will result in significantly reduced pipe performance as the pigments may affect mechanical performance and interfere with the reinforcing glass fibres resulting in reduced pipe performance. This pipe performance reduction is most notable when testing pipes for resistance to internal pressure, or hydrostatic design basis testing. Pigment inclusion in unsaturated polyester resins will—especially if these are solid inorganic compounds—affect the mechanical performance of the resin.

In the current invention the careful selection of liner construction, unsaturated polyester, nature of reinforcement, construction of layers combined with the right choices in pigmentation, e.g. amount of pigments has overcome this.

In principle, the failure in pipe performance is due to the incorporation of pigmentation fillers which effect mechanical strength of the reinforcing glass fibres. It was found out however that this effect was mostly due to the incorporation of harder pigmentation fillers, notably titanium oxide. Surprisingly, the selection of softer pigments, notably zinc sulphide or talc or calcium carbonate, permits pigmentation but without the damaging effect on mechanical strength. The Mohs hardness of the chosen pigment is considered crucial for maintenance of pipe properties.

All pigment inclusion in unsaturated polyester resins will affect the mechanical performance of the resin but both titanium oxide and zinc sulphide pastes reduce mechanical performance similarly at equivalent loadings in non-reinforced castings. It is only on incorporation also of reinforcing (glass) fibres that a reduction for titanium dioxide pastes versus zinc sulphide pastes is quantifiable.

Accordingly, in one further embodiment of the glass-reinforced plastic pipe liner of the invention, the pigments in layer B) and in optional layer A) are zinc sulphide pigments wherein the zinc sulphide pigments are present at 0.5-4.5 wt % per weight of the unsaturated polyester preferably at 1.0-4.0 wt % per weight of the unsaturated polyester.

Depending on the circumstances it might still be advantageous to use $TiO_2$. Thus, in one further embodiment of the glass-reinforced plastic pipe liner of the invention, the pigments in layer B) and in optional layer A) are TiO2-pigments wherein the zinc sulphide pigments are present at 0.5-4.5 wt % per weight of the unsaturated polyester preferably at 1.0-4.0 wt % per weight of the unsaturated polyester.

In one further embodiment of the glass-reinforced plastic pipe liner of the invention the at least one unsaturated polyester resin of layer B) and/or the optional layer A) has a tensile elongation to break >30%, preferably wherein all the unsaturated polyester resins of layer B) and/or of the optional layer A) have a tensile elongation to break >30%; more preferably wherein all the unsaturated polyester resins of layer B) and of the optional layer A) have a tensile elongation to break >30%.

This embodiment might also be an embodiment of "EMBODIMENT Z", "EMBODIMENT X" or "EMBODIMENT Y".

In one further embodiment of the glass-reinforced plastic pipe liner of the invention the at least one unsaturated polyester resin of layer B) and/or the optional layer A) has a tensile strength of >5 MPa, preferably wherein all the unsaturated polyester resins of layer B) and/or of the optional layer A) have a tensile strength of >5 MPa; more preferably wherein all the unsaturated polyester resins of layer B) and of the optional layer A) have a tensile strength of >5 MPa.

This embodiment might also be an embodiment of "EMBODIMENT Z", "EMBODIMENT X" or "EMBODIMENT Y".

In one further embodiment of the glass-reinforced plastic pipe liner of the invention the mechanical properties of the resin in layer B) and/or in the optional layer A) are >5 MPa tensile strength and >30% tensile elongation to break in a non-reinforced, non-pigmented, cured state.

This embodiment might also be an embodiment of "EMBODIMENT Z", "EMBODIMENT X" or "EMBODIMENT Y".

In one further embodiment of the glass-reinforced plastic pipe liner of the invention at least one unsaturated polyester resin of layer B) and/or of the optional layer A) is based on maleic anhydride, isophthalic acid and/or orthophthalic anhydride, preferably wherein at least one unsaturated polyester resin of layer B) and of optional layer A) is based on maleic anhydride, isophthalic acid and/or orthophthalic anhydride, more preferably wherein all the unsaturated polyester resins of layer B) and/or of optional layer A) are based on maleic anhydride, isophthalic acid and/or orthophthalic anhydride, most preferably wherein all the unsaturated polyester resins of layer B) and of optional layer A) are based on maleic anhydride, isophthalic acid and/or orthophthalic anhydride.

This embodiment might also be an embodiment of "EMBODIMENT Z", "EMBODIMENT X" or "EMBODIMENT Y".

In one further embodiment of the glass-reinforced plastic pipe liner of the invention the unsaturated polyester resin in optional layer A) is present at ≥70 wt %, ≥75 wt % or ≥80 wt %, or at ≥80 wt %, at ≥85 wt % or at ≥90 wt %, preferably at between and including 80-90 wt % or 90-99 wt % of the weight of the resin material of layer A), preferably wherein the unsaturated polyester resin in optional layer A) is present at ≥90 wt % or at between and including 90-97% of the weight of the resin material of layer A;

and/or wherein the unsaturated polyester resin in layer B) is present at ≥70 wt %, ≥75 wt % or ≥80 wt %, or at ≥80 wt %, at ≥85 wt % or at ≥90 wt %, preferably at between and including 80-90 wt % or 90-99 wt % of the weight of the resin material of layer B), preferably wherein the unsaturated polyester resin in optional layer B) is present at ≥90 wt % or at between and including 90-97 wt % of the weight of the resin material of layer B);

preferably
   wherein the unsaturated polyester resin in optional layer A) is present at ≥90 wt % or at between and including 90-97% of the weight of the resin material of layer A), and
   the unsaturated polyester resin in optional layer B) is present at ≥90 wt % or at between and including 90-97% of the weight of the resin material of layer B).

This embodiment might also be an embodiment of "EMBODIMENT Z", "EMBODIMENT X" or "EMBODIMENT Y".

In one further embodiment of the glass-reinforced plastic pipe liner of the invention the vinyl ester resin in layer B) and the optional layer A) is based on vinyl ester (meth) acrylates, preferably wherein the vinyl ester resins in layer B) and the optional layer A) are based on vinyl ester (meth)acrylates.

This embodiment might also be an embodiment of "EMBODIMENT Z", "EMBODIMENT X" or "EMBODIMENT Y".

In one further embodiment of the glass-reinforced plastic pipe liner of the invention the improved impact performance manifests itself at temperatures −30 to 45° C., or −5 to 45° C.

This embodiment might also be an embodiment of "EMBODIMENT Z", "EMBODIMENT X" or "EMBODIMENT Y".

A further aspect of the invention refers to a process for the production of the glass-reinforced plastic pipe liner of the invention, wherein the process is a continuous filament winding process or a discontinuous filament winding process. This process might also apply tp "EMBODIMENT Z", "EMBODIMENT X" or "EMBODIMENT Y".

In an embodiment of the process the invention rests in the process comprising the steps of:
   b) conveying, in a non-solid form at least one unsaturated polyester resin, optionally mixed with at least one vinyl ester resin to form a layer B) consisting of a coat formed from the at least one unsaturated polyester resin, optionally mixed with at least one vinyl ester resin, directly onto a mandrel or on top of an— optionally advancing—layer already on the mandrel circumferentially and axially to the mandrel by $2^{nd}$ application means, followed by applying as reinforcement non-woven fibres to the at least one unsaturated polyester resin, to form layer B);
   wherein at least one of the at least one unsaturated polyester resin, optionally mixed with at least one vinyl ester resin forming the layer B) comprises colour pigments present at 0.2-5.0 wt % per weight of the unsaturated polyester resin.

In one further embodiment of this process it comprises in addition a step:
   a) conveying, in a non-solid form at least one unsaturated polyester resin, optionally mixed with at least one vinyl ester resin to form a layer A) consisting of a coat formed from the at least one unsaturated polyester resin, optionally mixed with at least one vinyl ester resin directly onto a mandrel circumferentially and axially to the mandrel by $1^{st}$ application means, followed by applying as reinforcement a synthetic veil formed from spun-bond or thermally bonded fibres of polyester, polyamide or mixtures thereof to the at least one unsaturated polyester resin, to form layer A);
   wherein the unsaturated polyester resin, optionally mixed with at least one vinyl ester resin forming the layer A) optionally comprises colour pigments present at 0.2-5.0 wt % per weight of the unsaturated polyester resin.

In another separate embodiment of the process the invention rests in the process comprising the steps of:
   b) conveying, in a non-solid form at least one unsaturated polyester resin, optionally mixed with at least one vinyl ester resin to form a layer B) consisting of a coat formed from the at least one unsaturated polyester resin, optionally mixed with at least one vinyl ester resin, directly onto a mandrel or on top of an— optionally advancing—layer already on the mandrel circumferentially and axially to the mandrel by $2^{nd}$ application means, followed by applying as reinforcement non-woven fibres to the at least one unsaturated polyester resin, to form layer B).

In one further embodiment of this process it comprises in addition a step:
   a) conveying, in a non-solid form at least one unsaturated polyester resin, optionally mixed with at least one vinyl ester resin to form a layer A) consisting of a coat formed from the at least one unsaturated polyester resin, optionally mixed with at least one vinyl ester resin directly onto a mandrel circumferentially and axially to the mandrel by 1st application means, followed by applying as reinforcement a synthetic veil formed from spun-bond or thermally bonded fibres of polyester, polyamide or mixtures thereof to the at least one unsaturated polyester resin, to form layer A).

The invention is further illustrated by help of Examples which should not be understood as limiting.

EXAMPLES

Example 1

The tables below exemplify the performance of liner constructions versus the standard 'reference' pipe and the improvements in pipe properties. The standard reference pipe was a "Flowtite® pipe" on the market of the same diameter etc. without the liner of the invention, e.g. with an unsaturated polyester resin of low flexibility and without colour pigments.

Please note that as a distinguishing feature in both the Reference Example as well as the (Comparative) Example 1 a Layer C) is mentioned that consists of a coat being reinforced by chopped fibre strands, the coat being formed from at least one unsaturated polyester resin, optionally mixed with at least one vinyl ester resin. In the Example according to the glass-reinforced plastic pipe liner according to the invention (Example 2) and the Example according EMBODIMENT Z (Example 3) there is no layer (like Layer C)) reinforced by (comprising) chopped fibre strands.

TABLE 1

The pipes

| | Reference | Example 1 | Example 2 | Example 3 |
|---|---|---|---|---|
| Synthetic non-woven (A) | 0 mm | 0 mm | 0 mm | 0.25 mm |
| Glass non-woven (B) | 0.2 mm | 0.6 mm | 0.6 mm | 0.6 mm |
| Chopped glass strands (C) | 0.8 mm | 0.4 mm | 0 mm | 0 mm |
| Unsaturated polyester resin/resin blend Flexibility | low | high | high | high |
| Pigment paste | 0% | 3.5% ZnS paste | 3.5% ZnS paste | 0% |

TABLE 2

Result of Performance Tests

| | Reference | Example 1 | Example 2 | Example 3 |
|---|---|---|---|---|
| Abrasion DIN 19656 gravel, 100 000 cycles, wall loss/mm | 0.98 | 0.18 | 0.18 | 0.21 |
| Water jetting resistance DIN19523; Material test | fail | pass | pass | pass |
| Water jetting resistance DIN19523; Practical test, >30 passes | fail | fail | pass | pass |
| Resistance to internal pressure EN1447, time to failure at 0.9% strain/hrs | 1 000 | >5 000 | >10 000 | >10 000 |
| Impact performance at 20-25° C. (BS5480 Appendix J) 4000 g $H_{50}$/m | <0.2 | >3 no crack | >3 no crack | >3 no crack |
| Impact performance at 0.5° C. (BS5480 Appendix J) 515 g $H_{50}$/m | 1.1 | 5 | 3.5 | 3.5 |

All in all, the results of the performance test (Table 2) prove that the use of the liner of the invention shows surprisingly good results over the Reference tube and the tube of (Comparative) Example 1.

Thus, Examples 2 and 3 show superior results over the reference in the abrasion test and in all impact performance tests.

Comparing only Example 2 (the example with zinc sulphide as colour pigment) with the reference, Example 2 passes the water jetting resistance tests (both in the Material test as well as in the Practical test), whereas the reference fails and Example 2 is also superior in the resistance to internal pressure over the reference.

Comparing Example 3 (the example according to EMBODIMENT Z) with the reference, Example 3 passes the water jetting resistance tests (both in the Material test as well as in the Practical test), whereas the reference fails and Example 3 is also superior in the resistance to internal pressure over the reference.

Comparing Examples 2 and 3 (the examples of the invention) with Example 1 (which contains an additional Layer C) consisting of a coat being reinforced by chopped fibre strands, the coat being formed from at least one unsaturated polyester resin), the Examples of the invention pass the water jetting resistance tests (in the Practical test), whereas Example 1 surprisingly fails. In addition the Examples of the invention 2 and 3 are also superior in the resistance to internal pressure over (Comparative) Example 1.

The invention claimed is:

1. A glass-reinforced plastic pipe liner comprising
   a layer B) consisting of a coat being reinforced by non-woven fibres, the coat being formed from at least one unsaturated polyester resin, optionally mixed with at least one vinyl ester resin, wherein the layer B) comprises colour pigments present at 0.2-5.0 wt % per weight of the unsaturated polyester resin;
   a layer A) consisting of a second coat being reinforced by a synthetic veil formed from spun-bond or thermally bonded fibres of polyester, polyamide or mixtures thereof, the second coat being formed from at least one second unsaturated polyester resin, wherein the glass-reinforced plastic pipe liner does not comprise a layer consisting of a coat being formed from at least one unsaturated polyester resin being further reinforced by chopped fibre strands.

2. The glass-reinforced plastic pipe liner according to claim 1 wherein the layer A) is
   mixed with at least one second vinyl ester resin, optionally comprising second colour pigments present at 0.2-5.0 wt % per weight of the second unsaturated polyester resin.

3. The glass-reinforced plastic pipe liner according to claim 1 comprising in the layer A) second colour pigments present at 0.2-5.0 wt % per weight of the second unsaturated polyester resin; and/or wherein the layer B) has a thickness of 0.1-4.0 mm.

4. The glass-reinforced plastic pipe liner according to claim 1, wherein the layer A) has—thermally bonded—a thickness of 0.05-2.0 mm.

5. The glass-reinforced plastic pipe liner according to claim 1, wherein the layer B) is reinforced by a glass fibre non-woven veil.

6. The glass-reinforced plastic pipe liner according to claim 1, wherein the unsaturated polyester resin, optionally mixed with vinyl ester resin, in layer B) and/or the second unsaturated polyester resin in layer A) includes pigments selected from $TiO_2$ and zinc sulphide; and/or
wherein the pigments are present at 0.5-4.5 wt % per weight of the unsaturated polyester in layer B) and 0.5-4.5 wt % per weight of the second unsaturated polyester.

7. The glass-reinforced plastic pipe liner according to claim 1, wherein the at least one unsaturated polyester resin of layer B) and/or layer A) has a tensile elongation to break >30%.

8. The glass-reinforced plastic pipe liner according to claim 1, wherein the at least one unsaturated polyester resin of layer B) and/or the second unsaturated polyester resin of layer A) has a tensile strength of >5 MPa.

9. The glass-reinforced plastic pipe liner according to claim 1, wherein mechanical properties of the resin in layer B) and/or in layer A) are >5 MPa tensile strength and >30% tensile elongation to break in a nonreinforced, non-pigmented, cured state.

10. The glass-reinforced plastic pipe liner according to claim 1, wherein the at least one unsaturated polyester resin of layer B) and/or the second unsaturated polyester resin of layer A) is based on maleic anhydride, isophthalic acid and/or orthophthalic anhydride.

11. The glass-reinforced plastic pipe liner according to claim 1, wherein the second unsaturated polyester resin in layer A) is present at >80 wt %, >85 wt % or >90 wt %.

12. The glass-reinforced plastic pipe liner according to claim 2, wherein the vinyl ester resin in layer B) and/or the second vinyl ester resin in layer A) is based on vinyl ester (meth)acrylates.

13. A process for the production of the glass-reinforced plastic pipe liner according to claim 1, wherein the process is a continuous filament winding process or a discontinuous filament winding process.

14. The glass-reinforced plastic pipe liner according to claim 2 wherein the layer A) comprises second colour pigments present at 0.2-5.0 wt % per weight of the second unsaturated polyester resin.

15. The glass-reinforced plastic pipe liner according to claim 1, wherein the layer A) and the layer B) are filament-wound layers.

* * * * *